United States Patent [19]
Cristie

[11] 3,724,865
[45] Apr. 3, 1973

[54] CONVERTIBLE BICYCLE
[75] Inventor: Martin Cristie, Brooklyn, N.Y.
[73] Assignee: Stelber Industries Inc., Valley Stream, N.Y.
[22] Filed: Feb. 22, 1971
[21] Appl. No.: 117,604

[52] U.S. Cl..............280/7.11, 285/404, 287/103 R
[51] Int. Cl. ............................................B62k 13/08
[58] Field of Search............280/7.11, 7.1, 7.16, 7.17, 280/7.15, 287, 278; 287/58 CT, 103 R; 285/404

[56] References Cited

UNITED STATES PATENTS

| 3,608,917 | 9/1971 | Cogliano | 280/278 X |
| 625,612 | 5/1899 | Sternberg | 280/7.16 |
| 3,550,995 | 12/1970 | Quisenberry | 280/7.11 |
| 2,328,381 | 8/1943 | Jaffe | 285/404 X |
| 3,556,557 | 1/1971 | Blair | 287/103 R |
| 584,316 | 6/1897 | Baum et al | 280/7.11 X |

FOREIGN PATENTS OR APPLICATIONS 199,391  0/1924  Great Britain........................280/287

Primary Examiner—Leo Friaglia
Assistant Examiner—Milton L. Smith
Attorney—Robert I. Pearlman

[57] ABSTRACT

A bicycle which can be converted to a boys or girls bicycle design by means of a joiner unit providing for a removable horizontal tube between the seat support area and the head tube of the bicycle. The joiner unit preferably takes the form of a plastic bushing, adapted to receive a removable frame tube, which may be locked in place in the bushing element by means of a screw.

6 Claims, 2 Drawing Figures

PATENTED APR 3 1973　　　　　　　　　　　　　　　3,724,865

INVENTOR.
MARTIN CRISTIE

BY Robert D. Riordan

ATTORNEY

CONVERTIBLE BICYCLE

BACKGROUND OF THE INVENTION

The present invention relates to bicycles, and more particularly to a frame enabling the same basic bicycle frame to serve as both a boy's bicycle or a girl's bicycle.

In typical bicycle frame designs, it has become conventional to distinguish between bicycles for boys/men and girls/women principally on the basis of the frame design between the seat post support element and the head tube of the bicycle frame. In male models a substantially horizontally oriented bar is placed between the top portion of the head tube and the upper part of the bicycle seat post support. In female designs in order to enable mounting of the bicycle readily without requiring untoward lifting of the leg, the front of the frame is characterized by the absence of such a relatively high bar. Rather a tube sloping downwards from the head tube to a relatively low position on the seat support tube frame member is used.

Thus when buying a bicycle the consumer has heretofore had to make a choice whether to purchase a "boys" or "girls" bicycle, based on the foregoing design criteria. This presents a particular problem to parents of families having both boys and girls who wish to buy a single bicycle suitable for all children, as well as the ability to hand down the bicycle from an older to a younger child of different sex. Additionally, it presents a problem of flexibility in other ways. On the commercial side it requires both manufacturers and dealers to stock double the number of units of a given design in order to satisfy their potential customers' needs. Similarly, businesses which rent bicycles must additionally carry both boys and girls bicycle designs, and depending upon the demand at any given time be short of the desired type of bicycle.

Accordingly there would be considerable advantage in having a bicycle frame design capable of serving both as a boys or girls bicycle with easy conversion from one design to the other, at will. The present invention serves that need.

SUMMARY OF INVENTION

In accordance with the present invention, a bicycle frame design largely conventional in nature is modified to serve as a convertible bicycle by eliminating the fixed horizontally oriented tubular frame member found in a boys bicycle. In its place a joining unit adapted to receive a removable tubular member is positioned at the forward end of the frame tube leading from the upper part of the seat post support element to the rear portion of the bicycle where the back wheel is placed. When it is desired to use the bicycle as a boys design, one end of the removable tube, normally of a smaller diameter than the frame tube element containing the joining unit, is fixed into the joining unit, with its other end positioned against the head tube of the bicycle. The joining element preferably takes the form of a plastic or rubber bushing fixed to the rearly directed tube. The bushing is adapted to receive a smaller diameter removable tube, with the tube being fastened within the bushing by a self-threading screw. The portion of the removable tube pushed against the head tube preferably has an arced curvature to insure better fit against the head tube surface.

When the frame is to serve as a girls bicycle, the removable tube is withdrawn and the remaining elements of the frame design serve to provide the typical girls design, i.e. the connection between the head tube and seat support element being a frame element sloping downwardly so as to provide for easy mounting.

The various aspects of the present invention will be made more clearly apparant by reference to the accompanying drawings which fragmentarily illustrate a preferred embodiment of the present invention in conjunction with a cooperating bicycle frame structure.

DRAWINGS

DESCRIPTION OF A PREFERRED EMBODIMENT

Figure 1:
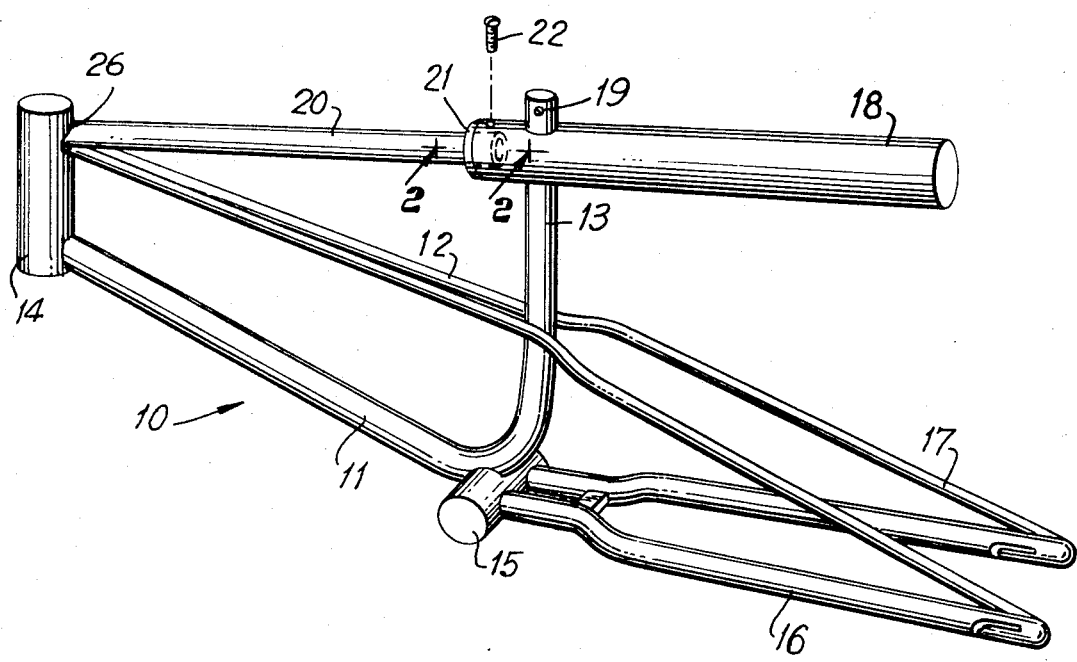
FIG. 1 is a fragmentary prospective view of a bicycle frame incorporating the present invention.

Referring to the drawings, there is fragmentarily illustrated in FIG. 1 a largely conventional frame 10 of a bicycle. Frame 10 has conventional head tube element 14. Lower support bar 11 connects the lower end of head tube 14 to frame element 15, frame element 15 being adapted to receive the axle of the pedal means, etc. Vertically extending upward from unit 15 is seat support element 13 having means 19 at its top to receive and hold a seat unit, not shown.

Further extending from head tube 14 to seat support element 13 may be one or more support tubes 12. While shown as being of a straight tube design, support element 12 can be a downwardly curved tube or the like as normally found in girls bicycle designs. Rear support elements 17 and 16 extend to the area which receives the back wheel of the bicycle in a typical manner.

As is conventional, a tube element 18 extends rearly from the upper portion of the seat support element 13 towards the back wheel support area of the frame. While FIG. 1 illustrates a substantially horizontal support tube 18, it can be a curved element extending downwardly toward the rear area of the bicycle frame. Additionally in some designs tube 18 may replace rear support means 17, and bend downwardly to meet support member 16 which extends from the axle holding means 15.

In accordance with the present invention, a joiner unit 21 is positioned on frame tube member 18 at a point beyond its juncture with seat support 13. This joining element may be in the form of a sleeve or bushing element attached to receive and hold a removable tube element 20. Normally tube element 20 is of a smaller diameter than tube 18, and so it readily is inserted into element 21 and fixed thereby to the frame. By way of example, tube 20 can be a one inch tube fitting into a 1.5 inch tube 18 by means of reducing bushing 21. The tube is slipped into position and fixed in place by means of self-threading screw 22, as is better illustrated in FIG. 2.

Figure 2:
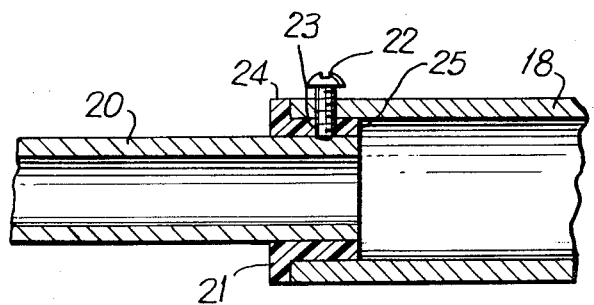
FIG. 2 is an enlarged view taken along plan 2—2 of FIG. 1 so as to better illustrate the joining unit.

As shown in FIG. 2, joining unit 21 may preferably be a plastic reducing bushing fixed in support tube 18 and adapted to receive removable tube 20. Front bushing wall 24 preferably fits flush with tube 18 with its interior wall 25 providing the necessary size reduction. After tube 20 is inserted therein screw 22 is fixed into channel 23 to hold tube 20 in place.

Front end 26 of removable tube 20 preferably has an arced end 26 so as to fit snugly against the curved surface to head tube 14. It preferably also rests on support tube 12 where the latter meets head tube 14.

Various other designs for joining unit 21 will readily suggest themselves to those skilled in the art. For example, a tapered plastic or rubber joiner can also be used with the possible elimination of the need for screw element 22. The head tube may be modified to better hold the removable tube element, such as being slotted to receive the forward end thereof.

Thus, in accordance with the present invention, a bicycle can readily be converted from a boys design to a girls unit or vice versa by the simple removal or insertion of removable tube 20 by means of joiner element 21. It is additionally possible to further vary the appearance of the bicycle by having alternate designs for tubes 20, e.g. with console units, swedged tapered designs, stick shifts, etc. and thus have various boys bicycle units. Accordingly, the present invention affords a great deal of flexibility in modifying the basic boys/girls bicycle to meet the requirements and desires of the user.

Having described the present invention that which is claimed is set forth in the following claims.

CLAIM:

1. In a bicycle frame having a head tube, a seat support element and a frame tube extending rearwardly from the upper part of said seat support element, means for converting said bicycle frame between a boys and girls design which comprises, joining means fixed to the front end of said frame tube for removably receiving a tube member for extending between said frame tube and the head tube of said bicycle frame, a fixed frame support element extending downwardly from the upper portion of said head tube to said seat support element below said frame tube, said fixed support element being adapted to have the front end of said removable tube member seated thereon when positioned against said head tube.

2. The combination of claim 1 which further comprises a tube member removably positioned in said frame tube.

3. The combination of claim 1 wherein the end of said tube extending against said head tube is curved to fit snugly against said head tube when in place.

4. The combination of claim 1 wherein said joining means is in the form of a bushing fitted in said frame tube, and adapted to receive a removable tube member of smaller diameter than said frame tube.

5. The combination of claim 4 wherein said bushing and said frame tube have an aligned channel to receive a screw element for holding said removable tube member in place after insertion in said bushing.

6. The combination of claim 5, which further comprises a smaller diameter tube member positioned in said bushing and held in place by a screw element, said tube member extending to said head tube.

* * * * *